United States Patent Office

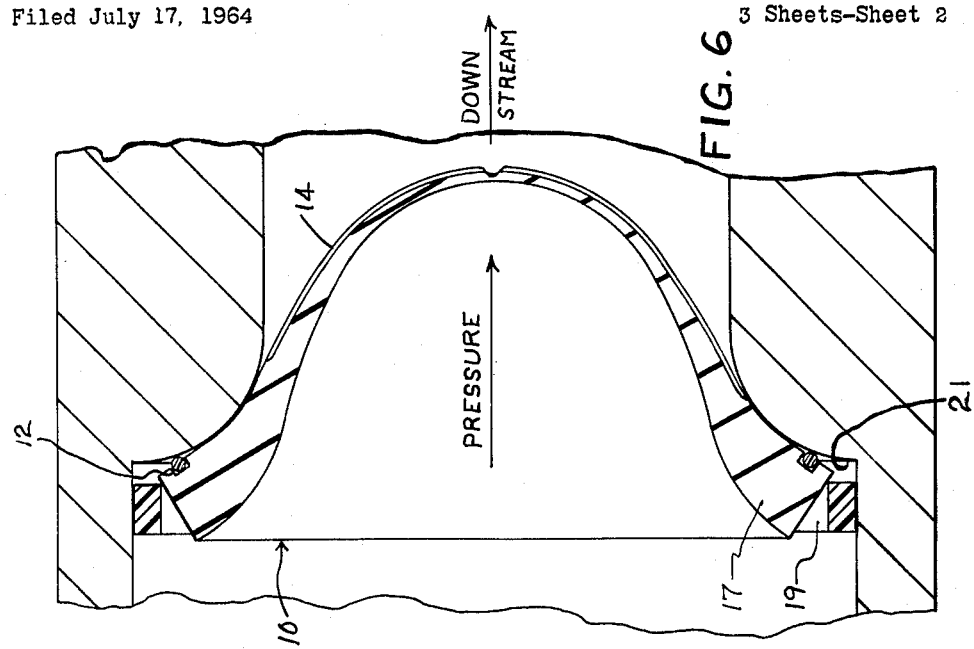
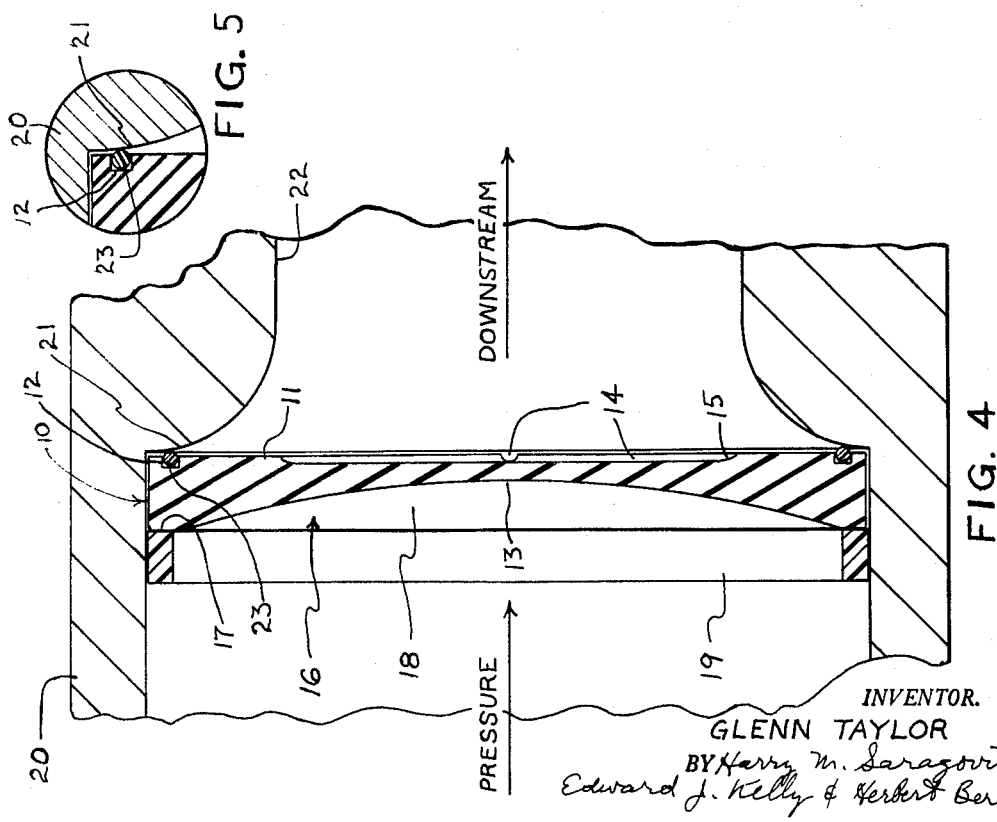

3,257,026
Patented June 21, 1966

3,257,026
HIGH PRESSURE QUICK OPENING VALVE
Glenn Taylor, Havre de Grace, Md., assignor to the United States of America as represented by the Secretary of the Army
Filed July 17, 1964, Ser. No. 384,050
2 Claims. (Cl. 220—89)

The invention described herein may be manufactured and used by or for the Government for governmental purposes, without the payment to me of any royalty thereon.

The invention relates to high pressure quick opening valves and more specifically to that type of valve which is ruptured under high fluid pressure to permit the passage of fluid therethrough. Such valves are well known but for the most part do not rupture uniformly; frequently fracture into pieces which are discharged downstream at high velocity whereby they frequently cause damage to the line or to instruments or apparatus in the line; provide no protection for the valve seat; or do not rupture consistently at a predetermined pressure. Likewise, such known valves must be secured in the line by being clamped between joints whereby replacement required the disconnecting of the joint or at the least the removal and placement of clamping means for securing the valve in place. The valve of the invention is intended for use with pressures of from 400 atmospheres to 10,000 atmospheres. It is not ideally suited for pressures below 400 atmospheres. It is designed to open with extreme rapidity such as within 20 milliseconds.

With the foregoing in view, it is an object of the invention to provide an improved valve of the class described.

A further object is to provide such an improved valve which is secured in position solely by frictional means so as to avoid the use of separate clamping means.

A further object is to provide an improved valve of the class described which includes integral means for causing rupture thereof to be along predetermined lines and at predetermined pressures.

A further object is to provide such an improved valve which is retained in the line after rupture with the segments of the ruptured valve providing a nozzle for the discharging fluid, which nozzle affords protection for the valve seat and surrounding area throughout the discharge of the fluid.

A further object is to provide for such a valve a novel seat having a configuration to which the valve conforms before its rupture and which the ruptured valve covers during the fluid discharge.

A further object is to provide an improved high pressure, quick acting valve which includes unique surface and cross sectional formations which enable it to achieve the foregoing objects.

Other objects and advantages reside in the particular structure of the valve, the structure of the seat therefor, subcombinations, combinations, and arrangement of the valve, seat and other elements of the assembly, all of which will be readily apparent to those skilled in the art upon reference to the attached drawing which illustrates one embodiment of the invention in connection with the following specification wherein the invention is described and claimed.

In the drawing:

FIGURE 4 is a diametral sectional view of the valve showing the same in place in a conduit but not under an operational pressure;

FIGURE 5 is an enlarged view of a detail of FIGURE 4;

FIGURE 6 is a view similar to FIGURE 4 but showing the valve under pressure but prior to rupture.

Figure 1:
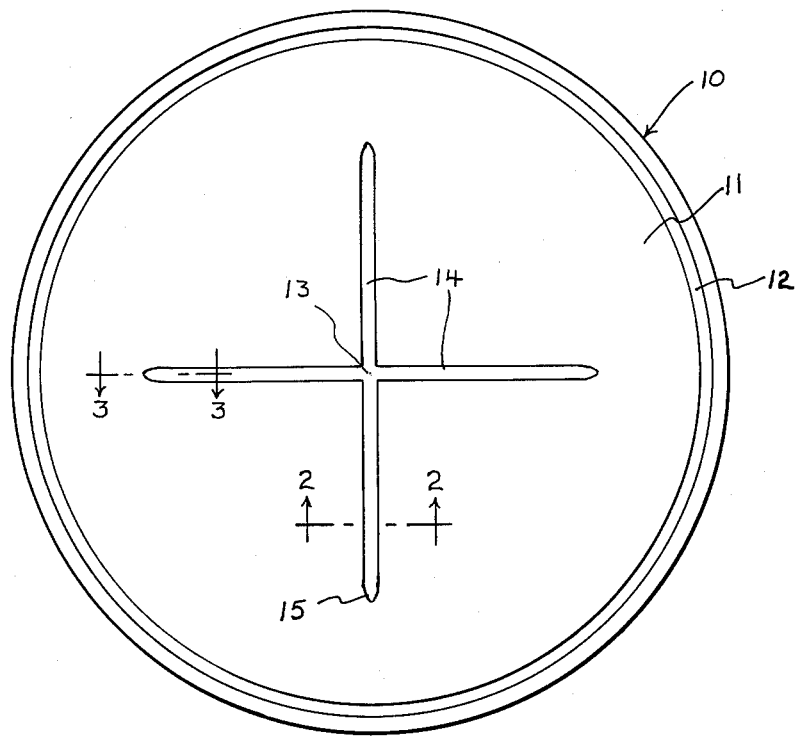
FIGURE 1 is a bottom plan view of a valve according to the invention, apart from the rest of the structure.
Figure 2:
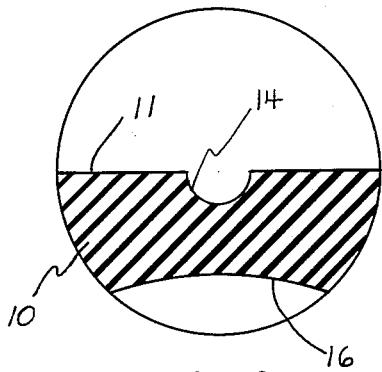
FIGURE 2 is an enlarged, fragmentary sectional view taken on the line 2—2 of FIGURE 1.
Figure 3:
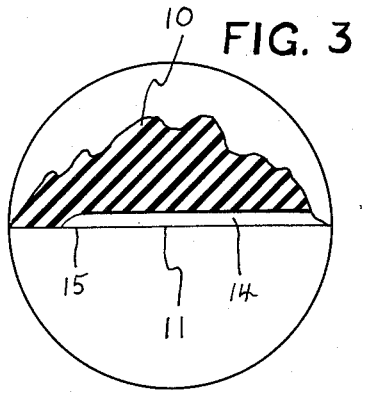
FIGURE 3 is an enlarged fragmentary sectional view taken on the plane of the line 3—3 of FIGURE 1.

Referring specifically to the drawing, wherein like reference characters designate like parts in all views, 10 designates a valve according to the invention which comprises a disc of any suitable resilient elastomeric material which is rupturable under high pressure. A marginal portion of the undersurface 11 is formed with an annular groove 12 for a purpose to be apparent hereinafter. The center 13 of the undersurface of the disc 10 is crossed by a plurality of diametral stress risers 14 which comprise straight grooves. Such stress riser-providing grooves 14 may be of arcuate cross section as shown and may have pointed outer ends 15.

The upper surface of the disc 10, as best seen in FIGURE 4, is generally designated at 16 and comprises a flat annular rim portion 17 and a concave central portion 18 which has the effect of progressively diminishing the thickness of the disc 10 from the inner margin of the flat rim 17 to the center 13. The flat rim 17 normally provides a seat for a non-metallic sealing washer 19 which has a friction fit in the conduit 20 in which the valve is mounted. Thus, the disc 10 is held in position in the conduit 20 with the marginal portion of the undersurface 11 resting on a valve seat 21 which forms a restricted outlet 22 for the conduit 20. An O-ring or the like 23 is carried in the annular groove 12 and is compressed against the valve seat 21 to provide a seal therewith. As shown, the valve seat 21 is rounded or arcuate in cross section to provide a curved surface which merges smoothly with the reduced outlet 22. In the embodiment illustrated, the outer ends 15 of the stress risers are substantially flush with the inner surface of the reduced outlet 22 for a purpose to be apparent.

Figure 7:
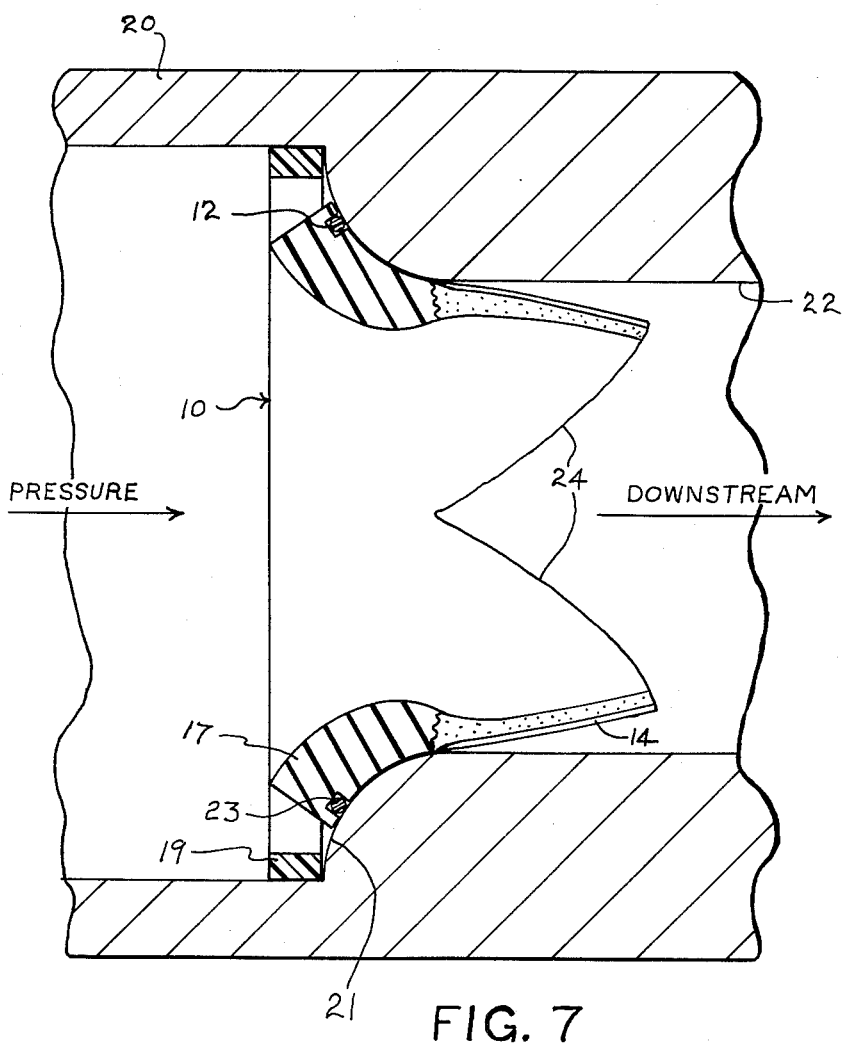
FIGURE 7 is a view similar to FIGURE 6 but showing the positions of the parts after rupture.

In operation, the assembly of washer 19, disc 10, and O-ring 23 is inserted into conduit 20 and seated on the valve seat 21 and secured thereon solely by the frictional fit of the washer 19 in the conduit. Upon the imposition of sufficient fluid pressure on the upstream surface 16 of the disc 10, the latter is stretched into a concavo-convex or hollow substantially hemispherical shape as shown in FIGURE 6. This action pulls the flat rim 17 from beneath the washer so that the same is free to move under pressure toward the valve seat 21. At the same time, the undersurface 11 outwardly of the ends 15 of the stress risers is conformed to the arcuate surface of the valve seat 21 so that the O-ring 23 remains in sealing relation therewith. The thinner central portion of the disc 10 together with the still thinner areas of the stress risers 14 is stretched until eventually the disc 10 is ruptured along the lines of the stress risers 14 as shown in FIGURE 7. Washer 19 is now seated on valve seat 21 and the thicker outer marginal portions of the disc 10 are fully conformed to the curvature of the valve seat 21. The washer 19 is interposed between the walls of the conduit 20 and the thickened marginal portion of the disc 10 to protect such marginal portion of the disc from water pressure and, thereby, to assist in retaining the disc 10 in place during the outflow of the fluid. The flaps 24 which are formed by the rupture along the stress risers 14, together with that portion of the disc 10 which has been conformed to the shape of the valve seat 21 define a nozzle of reduced diameter for the escaping fluid and also provide complete protection for the valve seat 21. As the bases of the flaps 24 are their thickest part, they are not separated from the rim of the disc 10 so that they cannot escape downstream and cause damage to anything in the outlet 22.

When the flow is complete, the ruptured valve or disc 10 is readily removed from the upstream side of the valve seat and replaced by an undamaged valve. The O-ring 23 and washer 19 are usually undamaged and they may be reassembled with a substitute disc 10.

When the disc 10 is deformed to the FIGURE 6 shape and position, there is, of course, a tendency for the entire disc to be collapsed umbrellawise and carried down the reduced outlet 22. This is prevented in part by the increased thickness and rigidity of the marginal portion of the disc 10, in part by the movement of the washer 19 into semi-sealing relation to the dislodged edge of the disc 10, and in part by the relation of these features to the bursting point of the disc along the stress risers 14. Thus, this bursting point can be so calculated with respect to the resistance to dislodgement of the marginal portion of the disc that rupture will occur before the pressure in question can collapse the disc entirely. Variance in resistance to rupture can be accomplished by varying the depth of the stress risers and/or varying the concavity of the upstream side 16 of the disc. Likewise, the resistance of the marginal portions of the disc 10 may be varied by strengthening or weakening it by varying the thickness or by adding or subtracting collapse-resisting reinforcements. To some extent, the characteristics of the valve can be varied by varying the cross sectional shape of the valve seat 21 or the size of the reduced outlet 22.

From the foregoing, it is apparent that a valve can be formed which will rupture at great speed at a variety of predetermined high pressures but which protects not only the valve seat area but prevents the expelling of damaging valve fragments downstream. Furthermore, the valve of the invention is not required to be secured in position by separate clamping screws or the like, it may, therefore, be quickly replaced without the use of special skills or special tools. Likewise, it is a valve which can be manufactured at comparatively low cost by well-known manufacturing procedures. Moreover, there has been shown and described what is now thought to be the preferred species of the invention, it should be understood that the same is susceptible of other forms and expressions. Consequently, the invention is not considered to be limited to the precise structures shown and described hereinabove except as hereinafter claimed.

I claim:

1. The combination with a conduit having one end formed with a radially inwardly extending annular valve seat providing a restricted outlet for said conduit; of a high pressure quick opening valve seated on said seat, said valve comprising a disc of resilient rupturable material, said disc having a normally flat undersurface formed with an annular groove in overlying relation to said seat, an O-ring or the like seated in said groove to form a seal with said seat, said undersurface of said disc being formed with a plurality of radially extending grooves providing lines of weakness intersecting centrally of said undersurface, said grooves having outer ends terminating in substantially flush relation to said restricted outlet of said conduit, said disc having an upper surface of concave configuration to provide a progressively thinner cross section toward said intersection of said grooves, a substantially flat annular seat on said upper surface of said disc marginally thereof, a sealing washer in frictionally sealing relation to said conduit normally seated on said last named annular seat, and said disc being adapted to be deformed to a substantially hemispherical shape under high pressure and to rupture along said grooves at a predetermined high pressure to provide a nozzle of restricted area for fluid discharging through said restricted outlet.

2. The combination of claim 1, wherein said first named valve seat is of rounded configuration in cross section, and wherein portions of said deformed disc are adapted to conform to said rounded cross section of said first named valve seat.

References Cited by the Examiner

UNITED STATES PATENTS

| | | | |
|---|---|---|---|
| 2,630,939 | 3/1953 | Jones | 220—89 |
| 2,663,458 | 12/1953 | MacGlashan | 220—89 |
| 3,005,573 | 10/1961 | Dawson et al. | 220—89 |

THERON E. CONDON, *Primary Examiner.*

RAPHAEL H. SCHWARTZ, *Examiner.*